US011927335B1

(12) United States Patent
Jiang

(10) Patent No.: US 11,927,335 B1
(45) Date of Patent: Mar. 12, 2024

(54) WATERPROOF BASE CONVENIENT TO MAINTAIN AND STAGE LIGHT FIXTURE HAVING SAME

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 17/975,989

(22) Filed: Oct. 28, 2022

Related U.S. Application Data

(63) Continuation of application No. PCT/CN2022/124061, filed on Oct. 9, 2022.

(30) Foreign Application Priority Data

Sep. 30, 2022 (CN) ......................... 202211211824.4

(51) Int. Cl.
*F21V 31/00* (2006.01)
*F21V 15/01* (2006.01)
*F21V 17/18* (2006.01)
*F21V 21/30* (2006.01)
*F21W 131/406* (2006.01)

(52) U.S. Cl.
CPC ............ *F21V 31/005* (2013.01); *F21V 15/01* (2013.01); *F21V 17/18* (2013.01); *F21V 21/30* (2013.01); *F21W 2131/406* (2013.01)

(58) Field of Classification Search
CPC ........ F21V 31/005; F21V 15/01; F21V 17/18; F21V 21/30; F21W 2131/406
See application file for complete search history.

(56) References Cited

U.S. PATENT DOCUMENTS 6,964,503 B2 * 11/2005 Smith ...................... F21V 21/30 362/427
9,732,950 B2 * 8/2017 Dalsgaard ............... F21V 21/06
2004/0070984 A1 * 4/2004 Smith ...................... F21V 21/15 362/427
2008/0062692 A1 * 3/2008 Andersen .................. F21V 7/22 362/275
2013/0201703 A1 * 8/2013 Dalsgaard ............... F21V 21/30 362/427
2020/0018473 A1 * 1/2020 Jiang ....................... F21V 29/60

FOREIGN PATENT DOCUMENTS

CN 112443775 A * 3/2021 ....... F21W 2131/406

* cited by examiner

*Primary Examiner* — Tsion Tumebo
(74) *Attorney, Agent, or Firm* — MUNCY, GEISSLER, OLDS & LOWE, P.C.

(57) ABSTRACT

A waterproof base convenient to maintain includes a bottom frame which is integrally die-cast formed, and an upper cover with a pivoting hole covering the bottom frame. The upper cover includes a first cover body and a second cover body which are spliced to each other. The pivoting hole is formed by jointly splicing the first cover body and the second cover body, and an oil seal for sealing the outer side of a pivoting shaft penetrated the pivoting hole is disposed at the pivoting hole. The oil seal is mounted and fixed by a mounting plate. A first sealing strip seals the first cover body, the second cover body and the mounting plate with respect to each other, the first cover body and the second cover body abut against the bottom frame, and second sealing strips are disposed at abutting positions.

18 Claims, 5 Drawing Sheets

WATERPROOF BASE CONVENIENT TO MAINTAIN AND STAGE LIGHT FIXTURE HAVING SAME

CROSS REFERENCE TO RELATED APPLICATIONS

The present application is a continuation of International Application No. PCT/CN2022/124061, filed on Oct. 9, 2022, which claims priority from Chinese Patent Application No. 202211211824.4 filed on Sep. 30, 2022, all of which are hereby incorporated herein by reference.

TECHNICAL FIELD

The present invention relates to the technical field of stage light fixtures, and more particularly, relates to a waterproof base convenient to maintain and a stage light fixture having the same.

BACKGROUND

Generally, a base of a waterproof stage light fixture is in form of a cylinder body by drawing aluminum processing, with a front plate and a rear plate respectively disposed at two end openings of the cylinder body to form a closed cavity. In such light fixture, a pivoting shaft of a support arm of the light fixture penetrates the side wall of the cylinder body and inserts into the closed cavity. With such configuration, although well waterproof effect can be achieved, maintenance for the interior of the base can only be conducted through the two end openings, which improves difficulties of maintenance, and it is even necessary to completely separate the base with the support arm, causing more complicated to maintain.

SUMMARY

It is therefore an object of the present invention to provide a waterproof base convenient to maintain which is free from the aforesaid drawbacks of the prior art. The base according to the present invention can conduct maintenance of the interior thereof by removing an upper cover from a bottom frame without separating the base with the other components of the light fixture, such as a support arm.

According to the present invention, the waterproof base convenient to maintain includes a bottom frame and an upper cover with a pivoting hole covering on the bottom frame. The bottom frame is integrally formed by die-casting. The upper cover includes a first cover body and a second cover body which are spliced to each other. The pivoting hole is formed by jointly splicing the first cover body and the second cover body, and an oil seal for sealing an outer side of a pivoting shaft of the light fixture penetrated the pivoting hole is provided at the pivoting hole. The oil seal is preferably mounted and fixed by a mounting plate. A first sealing strip is further provided to seal the first cover body, the second cover body and the mounting plate with respect to each other. The first cover body and the second cover body are respectively abutted against the bottom frame, and a second sealing strip is provided at each abutting position.

In the waterproof base convenient to maintain according to the present invention, the upper cover is divided into the first cover body and the second cover body, and the pivoting hole is formed by jointly splicing the first cover body and the second cover body, so that it is possible to remove the upper cover from the bottom frame without disassembling other components to conduct convenient and quick maintenance on the interior of the waterproof base. In addition, the present invention uses oil seal to seal the outer side of the pivoting shaft of the light fixture, the first cover body, the second cover body and the mounting plate are sealed with respect to each other by the first sealing strip, and the first cover body and the second cover body respectively abut against the bottom frame, with the second sealing strip sealing each abutting position, in such easy way, the whole waterproof base can be waterproof. Compared to the existing waterproof base in form of a cylinder body by drawing aluminum processing, with two end openings closed, the structure of the waterproof base according to the present invention can be more flexible and can achieve more possibility of modeling designs of the base. What's more, the bottom frame is integrally formed by die-casting, resulting in rapid processing and high strength, and splicing assembly is not required, accordingly, the waterproof performance is much better.

According to the invention, the first sealing strip includes two waterproof rubber strips, each being respectively disposed on sides of the first cover body and the second cover body close to each other. The two waterproof rubber strips respectively seal the periphery of the mounting plate close to the first cover body and the second cover body. That is, the waterproof rubber strip may seal a portion where the first cover body or the second cover body and the mounting plate are in contact with each other, and/or seal a portion where the first cover body and the second cover body are in contact with each other, thereby making the entire upper cover waterproof.

According to the present invention, the second sealing strips disposed between the first cover body and the bottom frame as well as between the second cover body and the bottom frame are independent from each other, and each second sealing strip is respectively connected with each waterproof rubber strip into a whole. That is, each second sealing strip and the respect waterproof rubber strip are connected into a rubber ring to seal the periphery of the first cover body or the second cover body, so that there is no splicing gap between the second sealing strip and the waterproof rubber strip, thus achieving better waterproof performance.

According to the present invention, the first sealing strip is located on a side of the mounting plate away from the bottom frame. In such configuration, the first cover body and the second cover body may be horizontally pushed or pressed from top to bottom to assembly together. However, the first cover body and the second cover body are preferably pressed from top to bottom according to one embodiment of the present invention.

A clamping fastener is preferably provided on the first cover body and/or the second cover body, which is supported on a side of the mounting plate close to the bottom frame. The clamping fastener enables the first cover body and/or the second cover body to be fastened to the mounting plate, so as to ensure that the first sealing strip is always in a compressed state, thereby achieving more stable waterproof performance.

According to another embodiment, the first sealing strip is located on a side of the mounting plate close to the first cover body and the second cover body. In this way, the first cover body and the second cover body may be horizontally pushed to assembly the first cover body and the second cover body.

Accordingly, an accommodating groove for accommodating the first sealing strip is formed on a side of the mounting plate close to the first cover body and the second cover body, and an edge of the first cover body and/or the second cover body is at least partially inserted into the accommodating groove. In this way, the first sealing strip is fixed to the mounting plate, and the edge of the first cover body and/or the second cover body is at least partially inserted into the accommodating groove and cooperates with the side wall of the accommodating groove to press against the first sealing strip, so that more stable waterproof performance can be realized.

The first sealing strip at least partially extends out of the accommodating groove to bent to tighten the outer side wall of the accommodating groove. In such a way, the first sealing strip can be fixed more firmly, and the first sealing strip can prevent from being displaced or twisted when the edge of the first cover body and/or the second cover body is inserted into the accommodating groove.

According to the present invention, the second sealing strip is located on a side of the bottom frame close to the mounting plate, or is located on the outer side of the bottom frame, or is partially located on the side of the bottom frame close to the mounting plate, and partially located on the outer side of the bottom frame.

According to the present invention, each of two opposite sides of the mounting plate extends along the cover body to form a connecting plate. Each connecting plate is fixed to the bottom frame, the sides of the first cover body and the second cover body close to each other respectively abut against the mounting plate, and the first sealing strip is disposed between the first cover body and the mounting plate as well as between the second cover body and the mounting plate respectively. In this way, the first cover body and the second cover body are not in direct contact with each other. The connecting plate is located between the first cover body and the second cover body, the first cover body and the second cover body respectively abut against and are sealed to the mounting plate, and the end of the mounting plate is fixed to the bottom frame.

A third sealing strip is disposed at a position where the bottom frame abuts against the connecting plate, and the third sealing strip abuts against the first sealing strip or the second sealing strip into a whole, or connects with the first sealing strip or the second sealing strip into a whole. In such a way, the third sealing strip not only seals the mounting plate and the bottom frame, and the third sealing strip is also in sealed connection with the first sealing strip or the second sealing strip, thereby realizing the waterproof function of the waterproof base.

According to the present invention, a fixing plate for fixing the oil seal to the mounting plate is further provided. The fixing plate has two connecting plates respectively extending from two opposite sides perpendicular to the cover body, which are fixed to the bottom frame. The fixing plate can support the upper cover to improve the strength of the waterproof base, especially when the waterproof base is made of a plastic material.

According to the present invention, the mounting plate is fixed to a bottom plate of the bottom frame via a connecting column.

According to the present invention, the bottom frame includes a bottom plate, a front plate and a rear plate disposed on two opposite sides of the bottom plate. The front plate is provided with a display screen, the rear plate is provided with a socket. The upper cover abuts against the front plate, the rear plate and the bottom plate, and abutting positions are sealed. That is, the upper cover, the front plate, the rear plate and the bottom plate jointly form the waterproof base, and the upper cover may extend with a compensation plate to abut against the front plate, the rear plate or the bottom plate to form a closed cavity.

The first cover body and the second cover body can be disposed in sequence in a direction from the front plate to the rear plate, in such way, along a direction perpendicular to the length direction of the front plate and the rear plate, by moving the first cover body and the second cover body away from each other, the upper cover can be removed from the bottom frame, thus facilitating maintenance on components in the sealed cavity. Alternatively, the first cover body and the second cover body are disposed in sequence in a direction perpendicular to a direction from the front plate to the rear plate. In this way, along a length direction of the front plate and the rear plate, by moving the first cover body and the second cover body away from each other, the upper cover can be removed from the bottom frame to facilitate maintenance on components in the sealed cavity.

Further, the bottom frame further includes a left plate and a right plate disposed on two other opposite sides of the bottom plate, the upper cover abuts against the front plate, the rear plate, the left plate and the right plate, and abutting positions are sealed. That is, the upper cover, the front plate, the rear plate, the left plate, the right plate and the bottom plate jointly form the waterproof base. The upper cover may extend with a compensation plate to abut against the front plate, the rear plate, the left plate, the right plate or the bottom plate to form a closed cavity.

The present invention further provides a stage light fixture, which applies the waterproof base described above.

The light fixture further includes a support arm pivotally connected to the waterproof base and a light head pivotally connected to the support arm. The light head can rotate in a first dimension relative to the support arm, and the support arm can rotate in a second dimension relative to the waterproof base.

DETAILED DESCRIPTION

Figure 1:
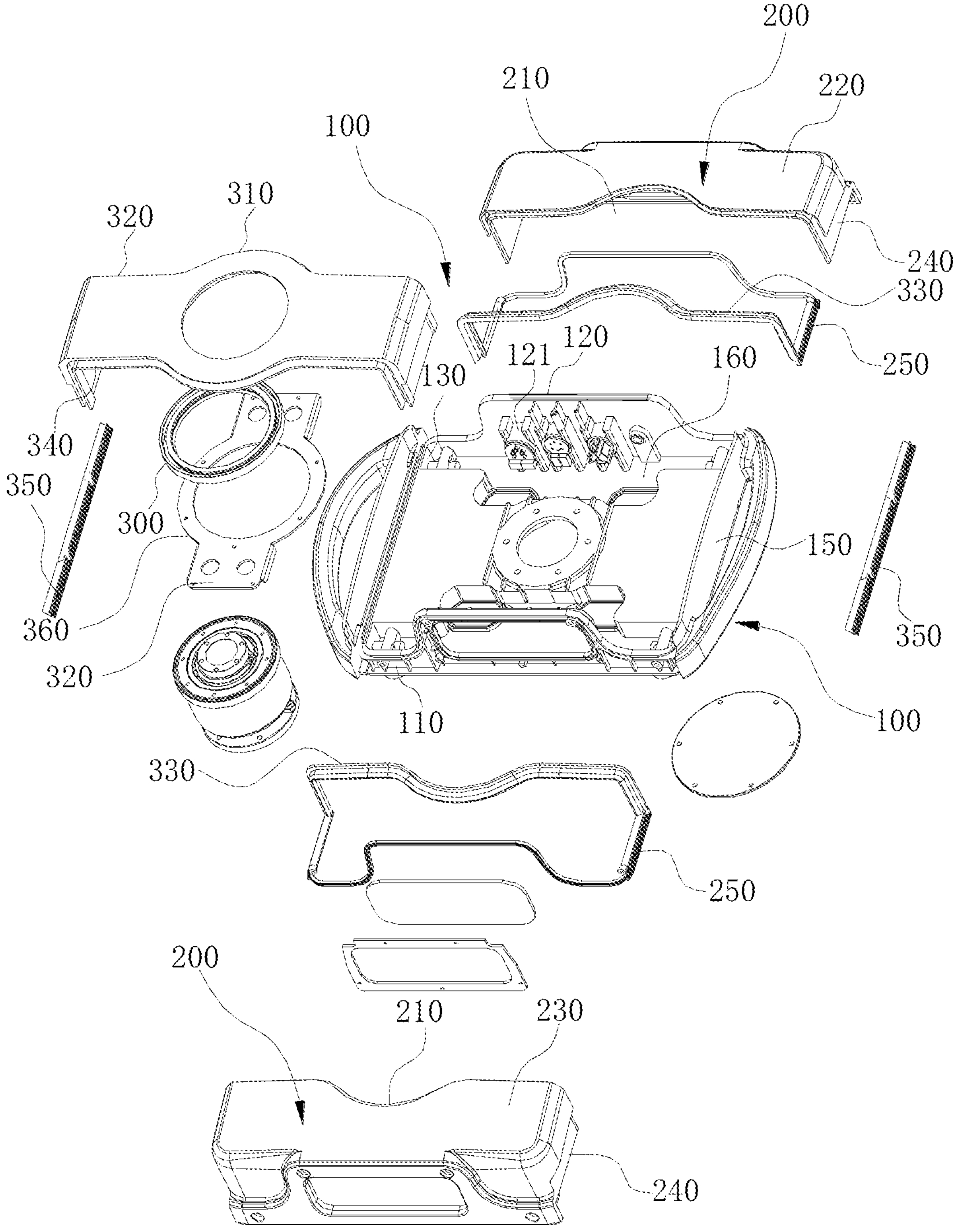
FIG. 1 is a schematic structural diagram according to one embodiment of the present invention.

The accompanying drawings are for exemplary illustration only, and should not be construed as limitations on this patent; in order to better illustrate this embodiment, some parts in the accompanying drawings may be omitted, enlarged or reduced, and they do not represent the size of the actual product; for those skilled in the art, it is understandable that certain well-known structures and descriptions thereof in the drawings may be omitted. The positional relationship described in the drawings is only for exemplary illustration, and should not be construed as limitations on this patent.

A waterproof base convenient to maintain is provided according to at least one embodiment. Referring to FIG. 1, the waterproof base includes a bottom frame 100 and an upper cover 200 with a pivoting hole 210 covering the bottom frame 100. The bottom frame 100 is integrally formed by die-casting. The upper cover 200 includes a first cover body 220 and a second cover body 230 which are spliced to each other. The pivoting hole 210 is formed by jointly splicing the first cover body 220 and the second cover body 230. An oil seal 300 is provided at the pivoting hole 210, which is configured for sealing the outer side of a pivoting shaft of the light fixture penetrated the pivoting hole 210. The oil seal 300 is preferably fixed by a mounting plate 310. A first sealing strip is further provided to seal the first cover body 220, the second cover body 230 and the mounting plate 310 with respect to each other. The first cover body 220 and the second cover body 230 abut against the bottom frame 100, respectively, and a second sealing strip 250 is provided at each abutting position thereof.

The waterproof base 400 with such configuration that the upper cover 200 is divided into two parts including the first cover body 220 and the second cover body 230, and the pivoting hole 210 is formed by jointly splicing the first cover body 220 and the second cover body 230, so that the upper cover 200 can be easily removed from the bottom frame 100 without disassembling other components to conduct convenient and quick maintenance on the interior of the waterproof base 400. In addition, the oil seal 300 is provided to seal the outer side of a pivoting shaft of the light fixture, the first cover body 220, the second cover body 230 and the mounting plate 300 are sealed with respect to each other by the first sealing strip, and the first cover body 220 and the second cover body 230 respectively abut against the bottom frame 100 with the second sealing strip 250 sealing each abutting position. In such easy way, the whole waterproof base 400 can be waterproof, and the structure of the waterproof base 400 in such configuration can be more flexible than the existing waterproof base in form of a cylinder body by drawing aluminum processing with two end openings closed. The waterproof base according to the embodiment thus can achieve more possibility of modeling designs of the base. Moreover, the bottom frame 100 is integrally formed by die-casting, resulting in rapid processing and high strength, and splicing assembly is not required, accordingly, the waterproof performance is much better.

The bottom frame 100 can be preferably made of a metal material such as aluminum. The upper cover 200 can be made of a metal material or a plastic material, and is preferably made of a metal material.

According to a preferable embodiment of the present invention, the first sealing strip includes two waterproof rubber strips 330. Each waterproof rubber strip 330 is respectively disposed on sides of the first cover body 220 and the second cover body 230 close to each other, which is configured to seal the periphery of the mounting plate 310 close to the first cover body 220 and the second cover body 230, respectively. That is, the waterproof rubber strip 330 may seal a portion where the first cover body 220 or the second cover body 230 and the mounting plate 300 are in contact with each other, and/or seal a portion where the first cover body 220 and the second cover body 230 are in contact with each other, thereby making the entire upper cover 200 waterproof.

Figure 2:
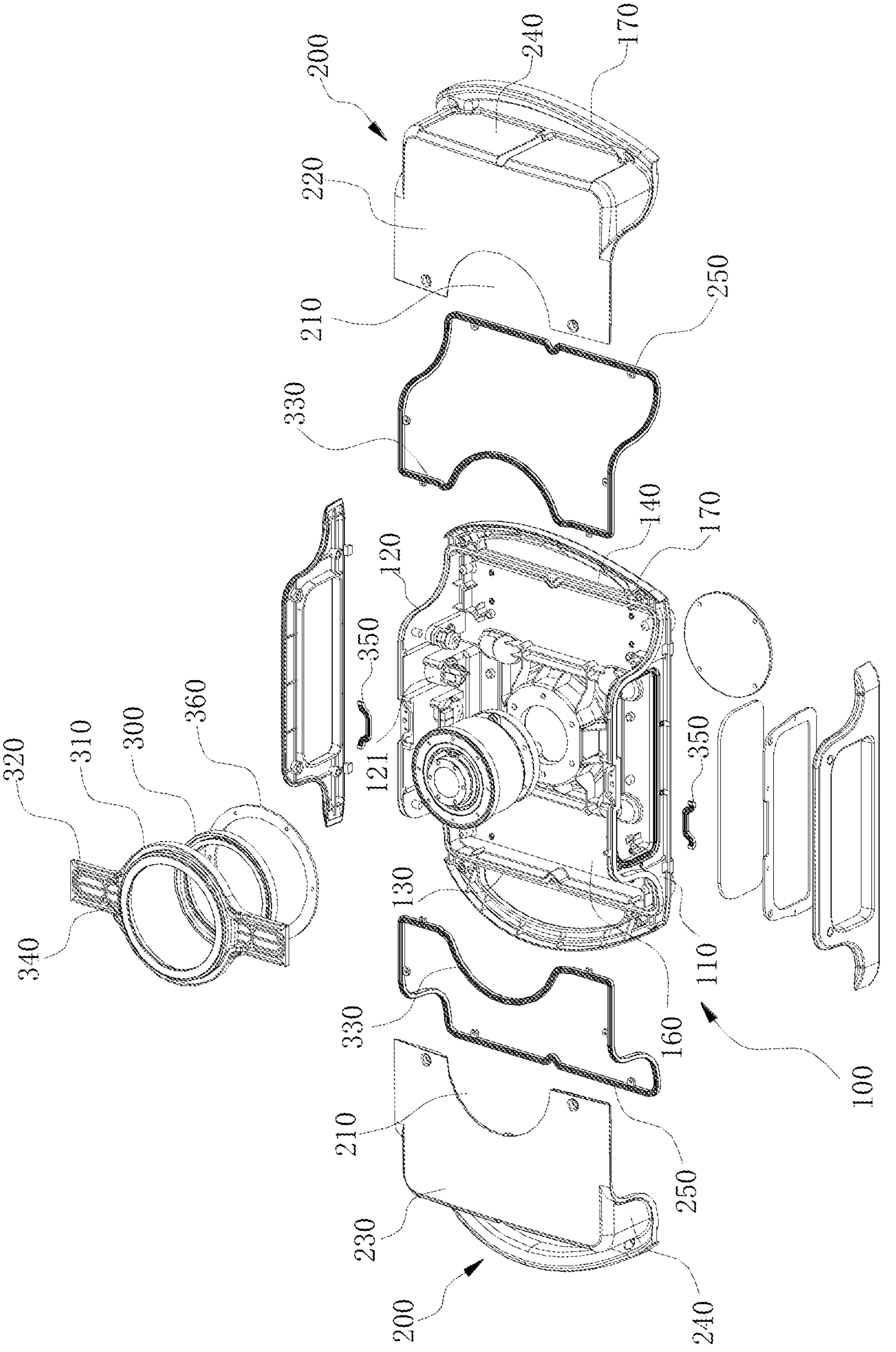
FIG. 2 is a schematic structural diagram according to one embodiment of the present invention.

Optionally, according to one embodiment, referring to FIG. 1 and FIG. 2, the mounting plate 310 completely separates the first cover body 220 with the second cover body 230. In this case, the first cover body 220 and the second cover body 230 are not in direct contact with each other, each waterproof rubber strip 330 thus seals the portion where the mounting plate 310 is in contact with each cover body 220, 230. According to another embodiment, referring to FIG. 4, the mounting plate 310 does not completely separate the first cover body 220 with the second cover body 230. In this case, the first cover body 220 and the second cover body 230 are at least partially in direct contact with each other, the waterproof rubber strip 330 thus not only seals a portion where the mounting plate 310 is in contact with each cover body 220, 230, but seals a portion where the first cover body 220 and the second cover body 230 are in direct contact with each other, thereby making the entire upper cover 200 waterproof.

In a preferable embodiment of the present invention, the second sealing strips 250 disposed between the first cover body 220 and the bottom frame 100 as well as between the second cover body 230 and the bottom frame 100 are independent from each other, and each second sealing strip is respectively connected with each waterproof rubber strip 330 into a whole. That is, each second sealing strip 250 and each waterproof rubber strip 330 are connected into a rubber ring to seal the periphery of the first cover body 220 or the second cover body 230, so that there is no splicing gap between the second sealing strip 250 and the waterproof rubber strip 330, thus achieving better waterproof performance.

Preferably, two of the rubber rings are in close abutting connection to achieve waterproofness, or two of the rubber rings are in abutting connection with a third sealing strip 350 to achieve waterproofness.

According to a preferable embodiment of the present invention, referring to FIG. 2, the first sealing strip is located on a side of the mounting plate 310 away from the bottom frame 100. In such configuration, the first cover body 220 and the second cover body 230 may be horizontally pushed or pressed from top to bottom to assembly together. In the embodiment shown in FIG. 2, the first cover body 230 and the second cover body 230 are preferably pressed from top to bottom.

Accordingly, an accommodating groove 340 for accommodating each first sealing strip is respectively formed in a side of the mounting plate 310 away from the bottom frame 100. In this way, the first sealing strip is fixed to the mounting plate 310, so that when the first cover body 220 and the second cover body 230 are disassembled and assembled, the first sealing strip is not necessary to be removed.

Figure 3:
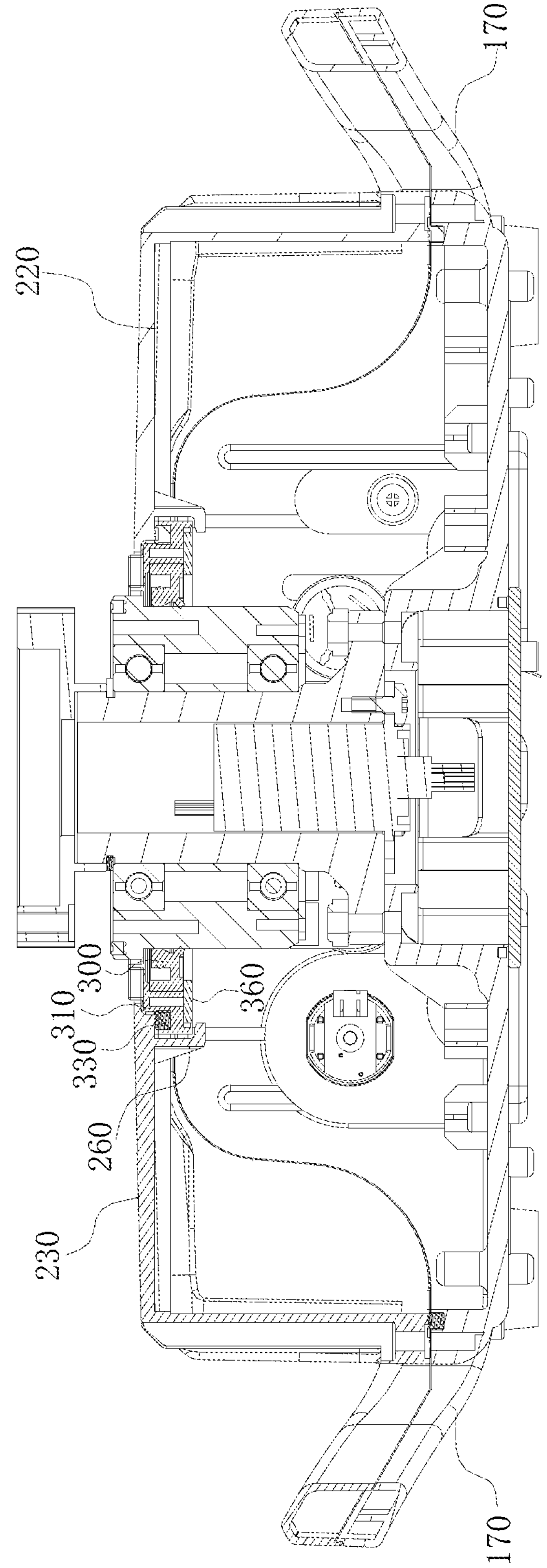
FIG. 3 is a schematic cross-sectional diagram of FIG. 2.

According to a preferable embodiment of the present invention, as shown in FIG. 3, a clamping fastener 260 is provided on the first cover body 220 and/or the second cover body 230, which is supported on a side of the mounting plate 310 close to the bottom frame 100. The clamping fastener 260 enables the first cover body 220 and/or the second cover body 230 to be fastened to the mounting plate 310, so as to ensure that the first sealing strip is always in a compressed state, thereby achieving more stable waterproof performance.

Optionally, a plurality of clamping fasteners 260 may be provided, or the clamp fastener 260 may be formed into a continuous one along the circumference of the first cover body 220 and/or the second cover body 230.

Referring back to FIG. 1, in a preferable embodiment of the present invention, the first sealing strip is located on a side of the mounting plate 310 close to the first cover body 220 and the second cover body 230. In this way, the first cover body and the second cover body may be horizontally pushed to assembly the first cover body 220 and the second cover body 230.

Accordingly, an accommodating groove 340 for accommodating the first sealing strip is formed on a side of the mounting plate 310 close to the first cover body 220 and the second cover body 230, and an edge of the first cover body 220 and/or the second cover body 230 is at least partially inserted into the accommodating groove 340. In this way, the first sealing strip is fixed to the mounting plate 310, and the edge of the first cover body 220 and/or the second cover body 230 is at least partially inserted into the accommodating groove 340 and cooperates with the side wall of the accommodating groove 340 to press against the first sealing strip, so that more stable waterproof performance can be realized.

In a preferable embodiment of the present invention, the first sealing strip at least partially extends out of the accommodating groove 340 and is bent to tighten the outer side wall of the accommodating groove 340. In such a way, the first sealing strip can be fixed more firmly, and the first sealing strip can prevent from being displaced or twisted when the edge of the first cover body 220 and/or the second cover body 230 is inserted into the accommodating groove 340.

In a preferable embodiment of the present invention, the second sealing strip 250 is located on a side of the bottom frame 100 close to the mounting plate 310, or is located on the outer side of the bottom frame 100, or is partially located on the side of the bottom frame 100 close to the mounting plate 310, and partially located on the outer side of the bottom frame 100.

As in FIG. 1 and FIG. 2, in a preferable embodiment of the present invention, each side of the mounting plate 310 extends along the cover body 220, 320 to form a connecting plate. Each connecting plate 320 is fixed to the bottom frame 100, the sides of the first cover body 220 and the second cover body 230 close to each other respectively abut against the mounting plate 310, and the first sealing strip is disposed between the first cover body 220 and the mounting plate 310 as well as between the second cover body 230 and the mounting plate 310 respectively. In this way, the first cover body 220 and the second cover body 230 are not in direct contact with each other. The connecting plate 320 is located between the first cover body 220 and the second cover body 230, the first cover body 220 and the second cover body 230 respectively abut against and are sealed to the mounting plate 310, and the end of the mounting plate 310 is fixed to the bottom frame 100. The configuration of the mounting plate 310 can improve the strength of the upper cover 200, especially when the upper cover 200 is made of a plastic material.

In a preferable embodiment of the present invention, a third sealing strip 350 is disposed at a position where the bottom frame 100 abuts against the connecting plate 320, and the third sealing strip 350 abuts against the first sealing strip or the second sealing strip 250 into a whole, or connects with the first sealing strip or the second sealing strip 250 into a whole. In such a way, the third sealing strip 350 not only seals the mounting plate 310 and the bottom frame 100, and the third sealing strip 350 is also in sealed connection with the first sealing strip or the second sealing strip 250, thereby realizing the waterproof performance of the waterproof base 400.

As in FIG. 1, according to a preferable embodiment of the present invention, a fixing plate 360 for fixing the oil seal 300 to the mounting plate 310 is further provided. The fixing plate 360 includes two connecting plates 320 respectively extending from two opposite sides perpendicular to the cover body 220, 230, which are fixed to the bottom frame 100. The fixing plate 360 can support the upper cover 200 to improve the strength of the waterproof base 400, especially when the waterproof base 400 is made of a plastic material.

Figure 4:
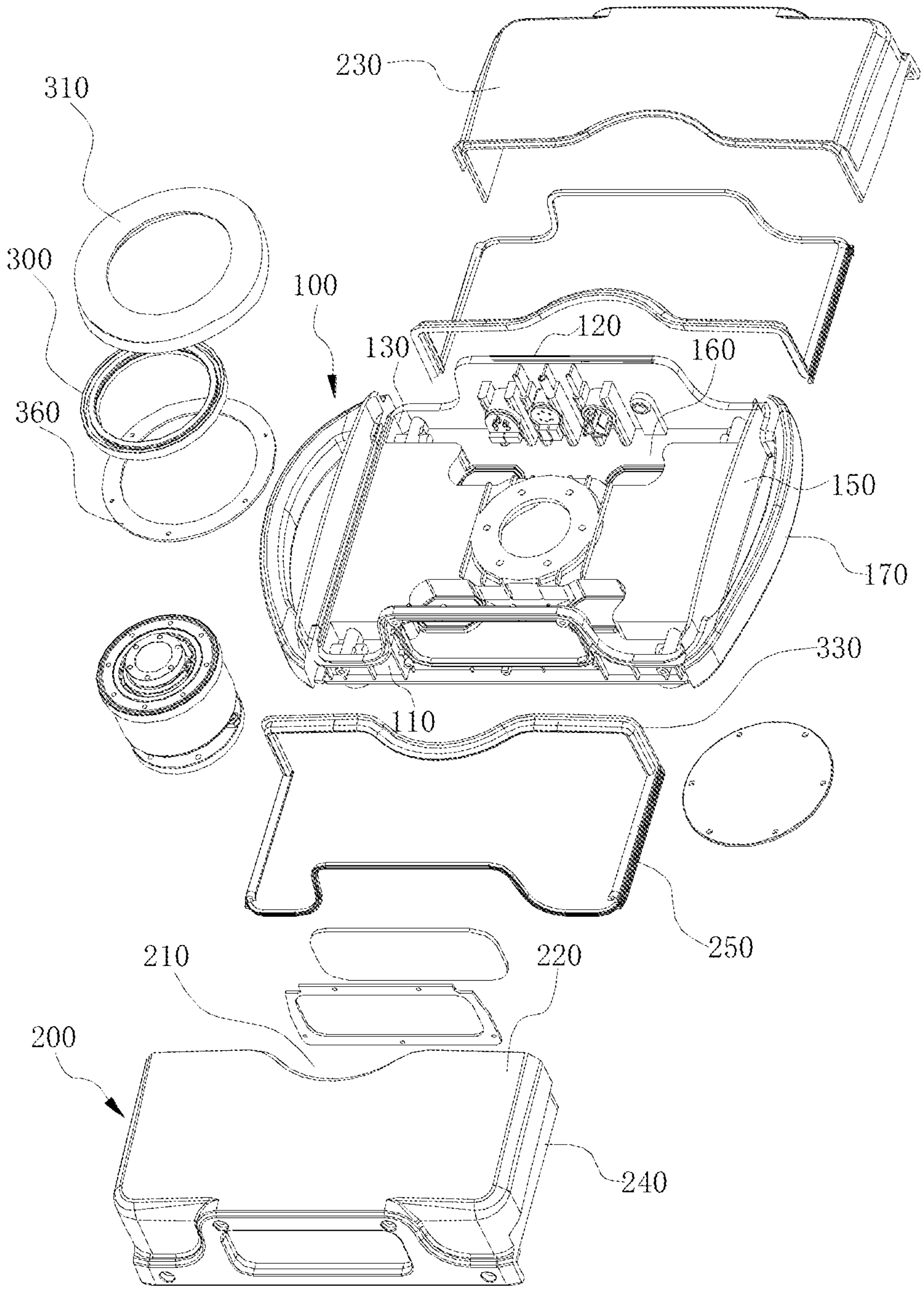
FIG. 4 is a schematic structural diagram according to one embodiment of the present invention.

As in FIG. 4, in a preferable embodiment of the present invention, the mounting plate 310 is fixed to a bottom plate 160 of the bottom frame 100 via a connecting column.

In a preferable embodiment of the present invention, except the bottom plate 160, the bottom frame 100 includes a front plate 110 and a rear plate 120 disposed on two opposite sides of the bottom plate 160. The front plate 110 is provided with a display screen, the rear plate 120 is provided with a socket 121. The upper cover 200 abuts against the front plate 110, the rear plate 120 and the bottom plate 160, and abutting positions are sealed. That is, the upper cover 200, the front plate 110, the rear plate 120 and the bottom plate 160 jointly form the waterproof base 400. The upper cover 200 may extend with a compensation plate 240 to abut against the front plate 110, the rear plate 120 or the bottom plate 160 to form a closed cavity.

Optionally, the second sealing strip 250 is used to seal portions of the front plate 110 and the rear plate 120 abutting against the upper cover 200, which are located on sides of the front plate 110 and the rear plate 120 away from each other.

As in FIG. 2, optionally, the connecting plates 320 extending from two opposite sides of the mounting plate 310 along the cover body 220, 230 is each fixed to the front plate 110 and the rear plate 120.

According to one embodiment, referring to FIG. 1 and FIG. 4, the first cover body 220 and the second cover body 230 are disposed in sequence in a direction from the front plate 110 to the rear plate 120. In such way, along a direction perpendicular to the length direction of the front plate 110 and the rear plate 120, by moving the first cover body 220 and the second cover body 230 away from each other, the upper cover 200 can be removed from the bottom frame 100, thus facilitating maintenance on components in the sealed cavity. According to another embodiment, referring to FIG. 2, the first cover body 220 and the second cover body 230 are disposed in sequence in a direction perpendicular to a direction from the front plate 110 to the rear plate 120. In this way, along the length direction of the front plate 110 and the rear plate 120, by moving the first cover body 220 and the second cover body 230 away from each other, the upper cover 200 can be removed from the bottom frame 100 to facilitate maintenance on components in the sealed cavity.

In other embodiments, the first cover body 220 and the second cover body 230 can be set in any direction as long as they can form a closed cavity with the bottom frame 100, for example, the projection of the first cover body 220 and the second cover body 230 on the bottom frame 100 is L-shaped.

As in FIG. 1 and FIG. 2, according to a preferable embodiment of the present invention, the bottom frame 100 further includes a left plate 130 and a right plate 140 disposed on two other opposite sides of the bottom plate 160, the upper cover 200 abuts against the front plate 110, the rear plate 120, the left plate 130 and the right plate 140, and abutting positions are sealed. That is, the upper cover 200, the front plate 110, the rear plate 120, the left plate 130, the right plate 140 and the bottom plate 160 jointly form the waterproof base 400. The upper cover 200 may extend with a compensation plate 240 to abut against the front plate 110, the rear plate 120, the left plate 130, the right plate 140 or the bottom plate 160 to form a closed cavity.

Preferably, a decorative plate 150 extends outside the left plate 130 and the right plate 140. The decorative plate 150 can be freely designed in shape and cooperates with the upper cover 200 to be shaped. In this situation, the upper cover 200 is still sealed to the left plate 130 and the right plate 140 directly.

Optionally, the second sealing strip 250 is used to seal portions of the left plate 130 and the right plate 140 abutting against the upper cover 200, which are located on sides of the left plate 130 and the right plate 140 close to the mounting plate 310.

As in FIG. 1, optionally, the connecting plate 320 extending from both sides of the mounting plate 310 is fixed to the left plate 130 and the right plate 140, respectively.

As in FIG. 1, optionally, the connecting plate 320 extending from both sides of the fixing plate 360 is fixed to the front plate 110 and the rear plate 120, respectively.

Optionally, the left plate 130 and the right plate 140 may have a low height, protruding out of the bottom plate 160 within 3 CM.

In the embodiment shown in FIG. 1, the second sealing strip 250 is disposed along the periphery of the bottom plate 160, and the top end of the left plate 130, the right plate 140, the front plate 110 and the rear plate 120.

Preferably, a handle 170 is provided outside the left plate 130 and the right plate 140.

Optionally, the handle 170 is integrally formed with the left plate 130 and the right plate 140.

As in FIG. 2, preferably, another handle 170 is provided outside the first cover body 220 and the second cover body 230.

Optionally, the handle 170 on the first cover body 220 and the second cover body 230 is integrally formed with the first cover body 220 and the second cover body 230.

Optionally, the handle 170 provided outside the left plate 130 and the right plate 140, and the handle 170 provided outside the first cover body 220 and the second cover body 230 are buckled into a whole.

As shown in FIG. 1, preferably, the connecting position of the connecting plate 320 with the front plate 110 and the rear plate 120 is located within the sealing range of the upper cover 200 with the front plate 110 and the rear plate 120.

Figure 5:
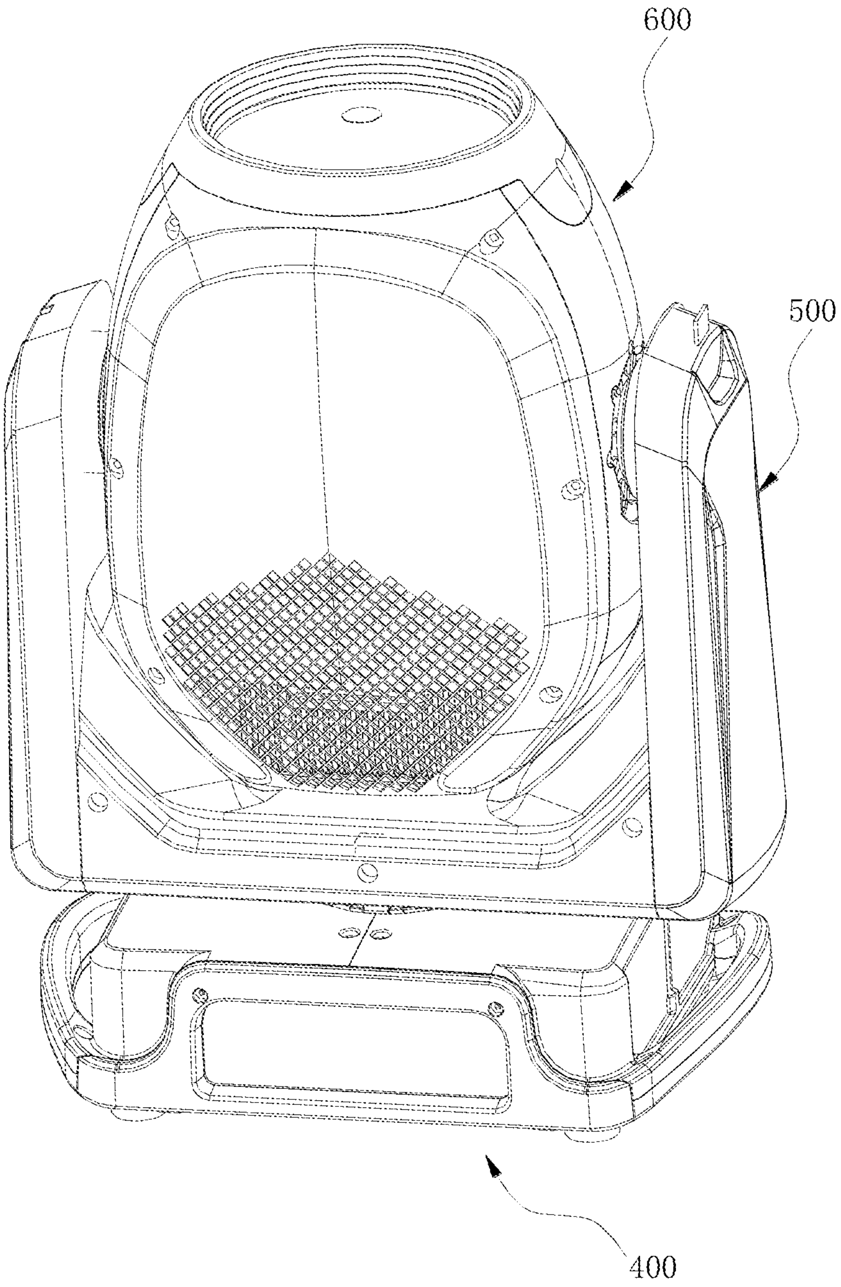
FIG. 5 is an overall schematic structural diagram of a stage light fixture according to the present invention.

As shown in FIG. 5, a stage light fixture is further provided, which includes the waterproof base 400 described above.

The light fixture further includes a support arm 500 pivotally connected to the waterproof base 400 and a light head 600 pivotally connected to the support arm 500. The light head 600 can rotate in a first dimension relative to the support arm 500, and the support arm 500 can rotate in a second dimension relative to the waterproof base 400.

Obviously, the above-mentioned embodiments of the present invention are only examples for clearly illustrating the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

The invention claimed is:

1. A waterproof base convenient to maintain, comprising a bottom frame, which is integrally formed by die-casting; and an upper cover with a pivoting hole covering on the bottom frame, which has a first cover body and a second cover body spliced to each other, the pivoting hole being formed by jointly splicing the first cover body and the second cover body, wherein an oil seal for sealing an outer side of a pivoting shaft penetrating the pivoting hole is disposed at the pivoting hole, which is mounted and fixed by a mounting plate, the mounting plate is abutted against sides of the first cover body and the second cover body close to each other at least at the pivoting hole;

the first cover body, the second cover body and the mounting plate are sealed with respect to each other by a first sealing strip, and the first cover body and the second cover body are respectively abutted against the bottom frame with a second sealing strip disposed at each abutting position.

2. The waterproof base convenient to maintain according to claim 1, wherein the first sealing strip comprises two waterproof rubber strips, each being respectively disposed on sides of the first cover body and the second cover body close to each other, which respectively seal the periphery of the mounting plate close to the first cover body and the second cover body.

3. The waterproof base convenient to maintain according to claim 2, wherein the second sealing strip disposed between the first cover body and the bottom frame is independent from the second sealing strip disposed between the second cover body and the bottom frame, and each second sealing strip is respectively connected with each waterproof rubber strip into a whole.

4. The waterproof base convenient to maintain according to claim 1, wherein the first sealing strip is located on a side of the mounting plate away from the bottom frame.

5. The waterproof base convenient to maintain according to claim 4, wherein a clamping fastener is provided on the first cover body or the second cover body, which is supported on a side of the mounting plate close to the bottom frame.

6. The waterproof base convenient to maintain according to claim 1, wherein the first sealing strip is located on a side of the mounting plate close to the first cover body and the second cover body.

7. The waterproof base convenient to maintain according to claim 6, wherein an accommodating groove for accommodating the first sealing strip is formed on a side of the mounting plate close to the first cover body and the second cover body, and an edge of the first cover body or the second cover body is at least partially inserted into the accommodating groove.

8. The waterproof base convenient to maintain according to claim 7, wherein the first sealing strip at least partially extends out of the accommodating groove and is bent to tighten the outer side wall of the accommodating groove.

9. The waterproof base convenient to maintain according to claim 1, wherein the second sealing strip is located on a side of the bottom frame close to the mounting plate, or is located on the outer side of the bottom frame, or is partially located on the side of the bottom frame close to the mounting plate, and partially located on the outer side of the bottom frame.

10. The waterproof base convenient to maintain according to claim 1, wherein each of two opposite sides of the mounting plate to form a connecting plate, each connecting plate is fixed to the bottom frame, the sides of the first cover body and the second cover body close to each other respectively abut against the mounting plate, and the first sealing strip is disposed between the first cover body and the mounting plate as well as between the second cover body and the mounting plate respectively.

11. The waterproof base convenient to maintain according to claim 10, wherein a third sealing strip is disposed at a position where the bottom frame abuts against the connecting plate, and the third sealing strip abuts against the first sealing strip or the second sealing strip into a whole, or connects with the first sealing strip or the second sealing strip into a whole.

12. The waterproof base convenient to maintain according to claim 1, further comprising a fixing plate for fixing the oil seal to the mounting plate, which has two connecting plates, each connecting plate being extending from two opposite sides respectively, and being fixed to the bottom frame.

13. The waterproof base convenient to maintain according to claim 1, wherein the mounting plate is fixed to a bottom plate of the bottom frame via a connecting column.

14. The waterproof base convenient to maintain according to claim 1, wherein the bottom frame comprises a bottom plate, and a front plate and a rear plate disposed on two opposite sides of the bottom plate, the front plate is provided with a display screen, the rear plate is provided with a socket, the upper cover abuts against the front plate, the rear plate and the bottom plate, and abutting positions are sealed by the first sealing strip and the second sealing strip.

15. The waterproof base convenient to maintain according to claim 14, wherein the first cover body and the second cover body are disposed in sequence in a direction from the front plate to the rear plate, or the first cover body and the second cover body are disposed in sequence in a direction perpendicular to a direction of the front plate to the rear plate.

16. The waterproof base convenient to maintain according to claim 14, wherein the bottom frame further comprises a left plate and a right plate disposed on two other opposite sides of the bottom plate, the upper cover abuts against the front plate, the rear plate, the left plate and the right plate, and abutting positions are sealed by the first sealing strip and the second sealing strip.

17. A stage light fixture, comprising the waterproof base according to claim 1.

18. The stage light fixture according to claim 17, further comprising a support arm pivotally connected to the waterproof base and a light head pivotally connected to the support arm, wherein the light head is configured to rotate in a first dimension relative to the support arm, and the support arm is configured to rotate in a second dimension relative to the waterproof base.

* * * * *